(12) United States Patent
Bostick et al.

(10) Patent No.: US 9,594,836 B2
(45) Date of Patent: Mar. 14, 2017

(54) ADJUSTING SEARCH LEVEL DETAIL

(75) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 1696 days.

(21) Appl. No.: 12/904,779

(22) Filed: Oct. 14, 2010

(65) Prior Publication Data

US 2012/0096375 A1     Apr. 19, 2012

(51) Int. Cl.
*G06F 3/0481* (2013.01)
*G06F 17/30* (2006.01)

(52) U.S. Cl.
CPC .............. *G06F 17/30864* (2013.01)

(58) Field of Classification Search
CPC ................ G06F 3/0481; G06F 3/04847
USPC ............... 715/765, 833; 707/706, 722, 765
See application file for complete search history.

(56) References Cited

U.S. PATENT DOCUMENTS

| | | | |
|---|---|---|---|
| 6,845,484 B1 | 1/2005 | Kraft et al. | |
| 7,934,161 B1* | 4/2011 | Denise | 715/738 |
| 2007/0204232 A1* | 8/2007 | Ray et al. | 715/738 |
| 2008/0235608 A1* | 9/2008 | Prabhu | 715/765 |
| 2009/0019348 A1* | 1/2009 | King | 715/205 |
| 2009/0293019 A1* | 11/2009 | Raffel et al. | 715/833 |
| 2010/0169297 A1* | 7/2010 | Haveliwala et al. | 707/706 |
| 2010/0235375 A1* | 9/2010 | Sidhu et al. | 707/765 |
| 2011/0218961 A1* | 9/2011 | Johnson et al. | 707/609 |

\* cited by examiner

*Primary Examiner* — Rashawn Tillery
(74) *Attorney, Agent, or Firm* — Yee & Associates, P.C.; Lisa J. Ulrich

(57) ABSTRACT

A method, data processing system, and computer program product for managing search results. The data processing system displays search results in a graphical user interface. The data processing system displays, concurrent with the display of the search results, a moveable graphical control in the graphical user interface. The data processing system changes a level of detail for the search results in response to a user moving the moveable graphical control.

3 Claims, 8 Drawing Sheets

ADJUSTING SEARCH LEVEL DETAIL

BACKGROUND

1. Field

The present invention relates generally to an improved data processing system and, in particular, to a method and apparatus for processing data. Still more particularly, the present invention relates to a method and apparatus for managing an amount of detail displayed for search results.

2. Description of the Related Art

The Internet is a set of computer networks that are joined together by components, such as gateways, to handle the transfer and conversion of messages from the protocol that is used by the sending network to the protocol used by the receiving network. The Internet carries information and provides services. The information and services include, for example, without limitation, electronic mail, online chat services, file transfers, web pages, and other resources.

The Internet is a commonly used source of information and entertainment. Further, the Internet is also used as a medium for business activities. Many businesses, government entities, and other organizations have a presence on the Internet using websites to perform various transactions.

In searching the Internet for information or goods and services, users may use a search engine to implement a key word search. A search engine is designed to search for information found on different websites on the World Wide Web. A search engine may generate information in a number of different ways. For example, a search engine may use a process to follow links on different sites and index those links in a database. Known search engines include, for example, Yahoo!search, Ask.com, Bing, Google, Altavista, and other types of search engines.

The user at a browser may send a query to a search engine. The query typically includes key words. The search engine examines an index and provides a listing of the best match and web pages according to various criteria. The listing also may include a URL link, a title of a document, a description of the document, parts of the text in the document, and other types of information.

SUMMARY

The different illustrative embodiments provide a method, a data processing system, and a computer program product for managing search results. The data processing system displays search results in a graphical user interface. The data processing system displays, concurrent with the display of the search results, a moveable graphical control in the graphical user interface. The data processing system changes a level of detail for the search results in response to a user moving the moveable graphical control.

DETAILED DESCRIPTION

Figure 1:
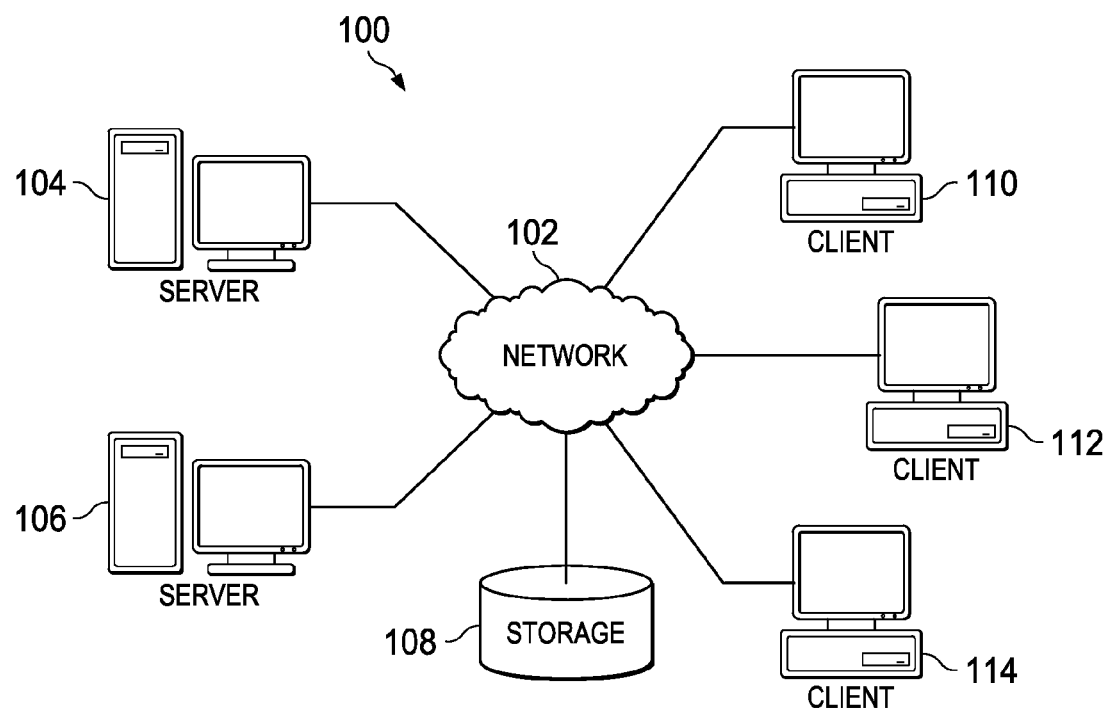
FIG. 1 is an illustration of a data processing environment in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product comprising computer-readable program code stored on a tangible computer-readable storage device.

Any combination of one or more computer-readable device(s) may be utilized. The tangible computer-readable storage device may be, for example, an electronic, magnetic, optical, electromagnetic, or semiconductor system, apparatus, or device. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disk read-only memory (CDROM), an optical storage device, or a magnetic storage device.

The computer program can be stored on a fixed or portable computer-readable storage media or downloaded from the Internet via a network in which the network includes electrical, optical and/or wireless communication links, routers, switches, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus via a computer-readable RAM such that the instructions, which execute via the processor of the computer or other programmable data processing apparatus, create means for implementing the functions/acts specified in the flowchart and/or block diagram block or blocks. These computer program instructions may also be stored in a computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded and installed onto a computer or other programmable data processing apparatus to cause a series of operational steps to be performed on the computer or other programmable apparatus to produce a computer implemented process such that the instructions, which run on the computer or other programmable apparatus, provide processes for implementing the functions/acts specified in the flowchart and/or block diagram block or blocks.

With reference now to the figures and, in particular, with reference to FIG. 1, an illustration of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is an illustration of a network of data processing systems in which illustrative embodiments may be implemented. Network data processing system 100 is a network of computers in which the illustrative embodiments may be implemented. Network data processing system 100 contains network 102, which provides communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, data processing systems, and other devices not shown.

Program code located in network data processing system 100 may be stored on a computer recordable storage device and downloaded to a data processing system or other device for use. For example, program code may be stored on a computer recordable storage device on server computer 104 and downloaded to client computer 110 over network 102 for use on client computer 110. One or more illustrative embodiments may be implemented to manage copies of data on network data processing system 100. In particular, one or more illustrative embodiments may be implemented to reduce the number of copies of data in a manner that reduces time needed to process requests for the data.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a cloud, a local area network (LAN), or a wide area network (WAN). FIG. 1 is intended as an example and not as an architectural limitation for the different illustrative embodiments.

Figure 2:
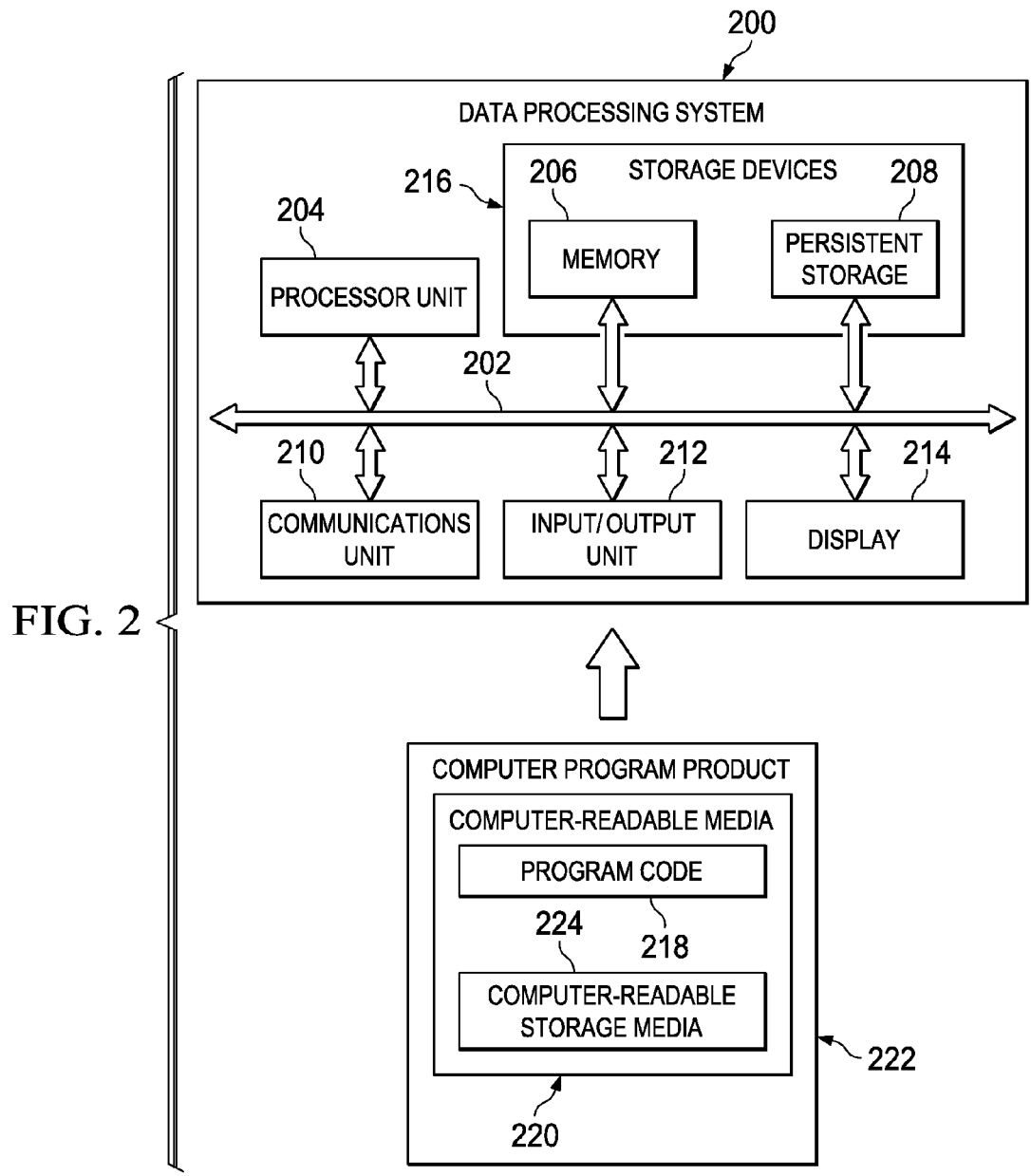
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a central processing unit (CPU), a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware, such as disk storage, that is capable of storing information, such as, for example, without limitation, data, program code in functional form, and/or other suitable information either on a temporary basis and/or a permanent basis. Storage devices 216 may also be referred to as computer-readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and/or wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer-usable program code, or computer-readable program code that may be read and run by a processor in processor unit 204. The program code in the different embodiments may be embodied on different physical or computer-readable storage media, such as memory 206 or persistent storage 208.

Program code 218 is located in a functional form on computer-readable media 220 that is selectively removable and may be loaded onto or transferred to data processing system 200 for running by processor unit 204. Program code 218 and computer-readable media 220 form computer program product 222 in these examples. In one example, computer-readable media 220 may be computer-readable storage media. Computer-readable storage media 224 may include, for example, an optical or magnetic disk that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory, that is connected to data processing system 200. In some instances, computer-readable storage media 224 may not be removable from data processing system 200. In these illustrative examples, computer-readable storage media 224 is also referred to as a computer-readable storage device.

Alternatively, program code 218 may be transferred to data processing system 200 using communications links, such as wireless communications links, optical fiber cable, coaxial cable, a wire, and/or any other suitable type of communications link. In other words, the communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

As another example, a storage device in data processing system 200 is any hardware apparatus that may store data. Memory 206, persistent storage 208, and computer-readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The illustrative embodiments recognize and take into account a number of different considerations. For example, the different illustrative embodiments recognize and take into account that a set of search results may include more search results than can be displayed in the window of a browser. This type of result may be inconvenient to a user. The user moves from one page of search results to another page of search results. Oftentimes, a user may need to traverse back to a prior page of search results to identify a desired search result for viewing.

Additionally, the different illustrative embodiments also recognize and take into account that with the use of browsers in different types of data processing systems, some data processing systems may provide less viewing area. For example, a data processing system in the form of a mobile phone may display fewer results on the display than a desktop computer. As a result, users of mobile phones may find it more difficult to review search results.

Thus, the different illustrative embodiments provide a method and apparatus for managing search results. In one illustrative embodiment, a method and apparatus is provided for managing search results. A data processing system identifies a set of search results. The data processing system displays the search results in a graphical user interface with a level of detail. The data processing system displays a moveable graphical control in the graphical user interface. The data processing system changes the level of detail in response to a user input moving the moveable graphical control.

Figure 3:
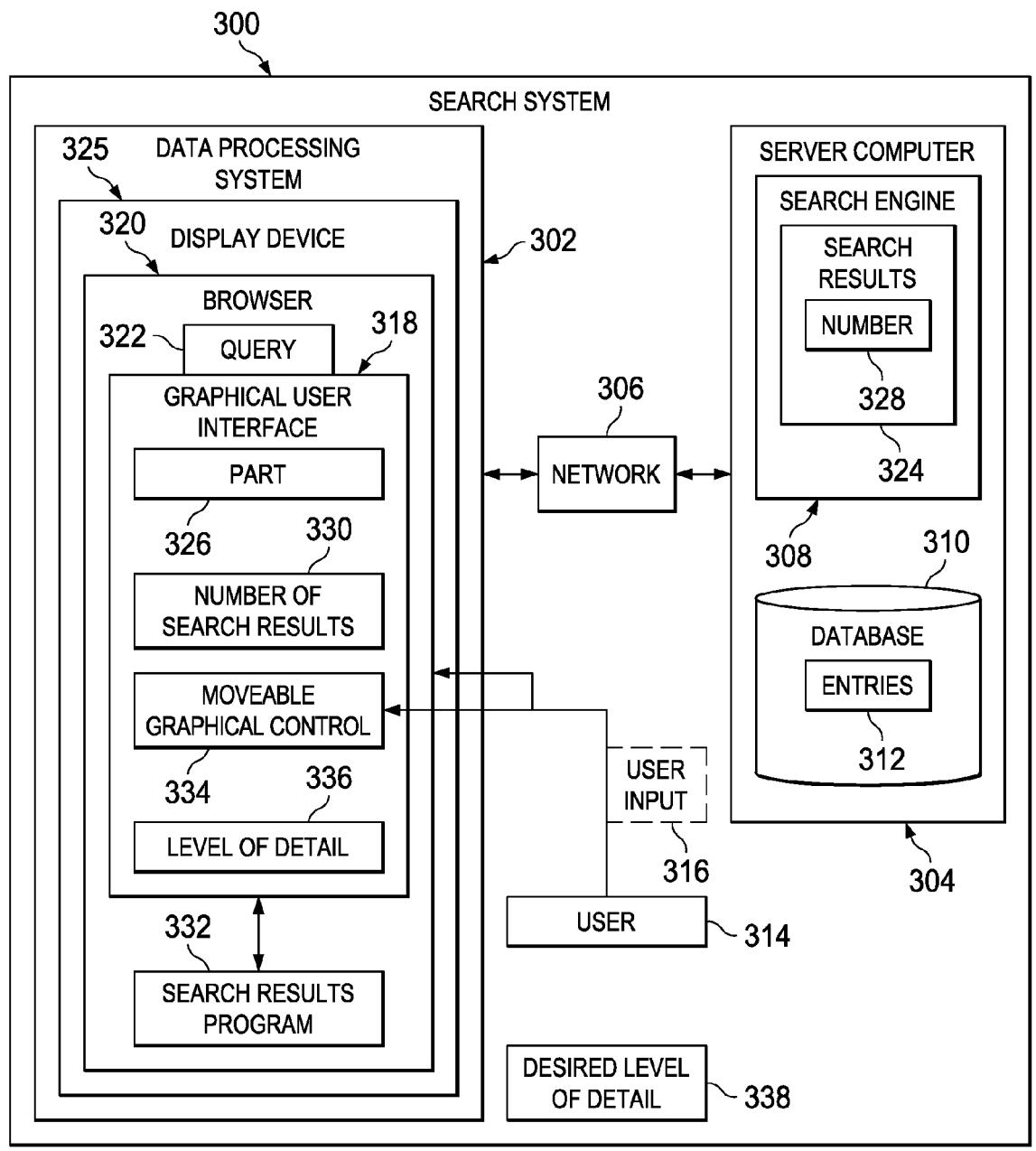
FIG. 3 is an illustration of a search environment in accordance with an illustrative embodiment.

With reference now to FIG. 3, an illustration of a search system is depicted in accordance with an illustrative embodiment. Search system 300 is an example of a search environment that may be implemented within network data processing system 100 in FIG. 1.

In this illustrative example, search system 300 includes data processing system 302 and server computer 304. Data processing system 200 in FIG. 2 is an example of one implementation for data processing system 302. Data processing system 302 is in communication with server computer 304 through network 306. As depicted, server computer 304 includes search engine 308 and database 310. Database 310 contains information about different web pages. For example, database 310 may include entries 312 for different web pages identified by search engine 308.

In this illustrative example, user 314 at data processing system 302 may enter user input 316 into browser 320 using graphical user interface 318. User input 316 is used by browser 320 to generate query 322. Query 322 is sent to search engine 308. Search engine 308 uses query 322 to search entries 312 in database 310. Search results 324 are generated by searching entries 312 in database 310 or the World Wide Web (WWW) using query 322. The database and the World Wide Web may comprise a collection of web pages represented by documents formatted in hypertext markup language (html). In these illustrative examples, query 322 typically takes the form of key words.

Search results 324 are returned to browser 320 for display. In these illustrative examples, search results 324 are displayed in graphical user interface 318 for browser 320 on display device 325 in data processing system 302. The search results typically comprise a Uniform Resource Locator ("URL") or WWW address of each web page that corresponds to the search query along with a respective human readable title or name of the respective web page. Further, the search results may include a list of related URLs and/or other human readable text extracted from the HTML document describing the respective web page. In the illustrative examples, only part 326 of each of search results 324 that corresponds to the search query is displayed on graphical user interface 318 because the large number 328 of search results 324 will not permit concurrent display of all the data for all the search results. User input 316 may indicate an amount or part 326 for each of search results 324 to be displayed. For example, user input 316 may request that only high level information for each of search results 324 is displayed. High level information is information with little detail. For example, user input 316 may request that only the URL and the title of the URL be displayed for each of search results 324.

Conversely, user input 316 may request that more detailed information for each of search results 324 is displayed. For example, user input 316 may request that the URL, the title of the URL, and a list of related URLs are displayed for each of search results 324. The number of search results that is actually displayed based on user input 316 is number of search results 330. For example, number of search results 330 is the number of search results 324 that may be displayed at the same time in a window in graphical user interface 318. Search results 324 that are displayed may be changed by, for example, scrolling through search results 324 in the window in graphical user interface 318. However, as which search results in search results 324 that are displayed changes, number of search results 330 stays the same.

Number of search results 330 that are displayed in graphical user interface 318 may not be as large as desired. In other words, number of search results 330 that are displayed may not include as many search results as desired by user 314.

In these illustrative examples, search results program 332 may manage the amount of information included in the display of search results 324 in graphical user interface 318. In these illustrative examples, search results program 332 displays moveable graphical control 334 in graphical user interface 318. User 314 may manipulate moveable graphical control 334 to form user input 316 in these illustrative examples to control the amount of information included in the display of each of search results 324.

Moveable graphical control 334 may take a number of different forms. For example, without limitation, moveable graphical control 334 may be a slider, a spinner, a dial, or some other suitable moveable graphical control. A moveable graphical control is an element of graphical user interface 318 that is configured to change level of detail 336 for search results 324 displayed in graphical user interface 318 in these illustrative examples. For example, predefined positions for moveable graphical control 334 may correspond to predefined levels of detail for search results 324. Movement of moveable graphical control 334 to a particular predefined position changes level of detail 336 to a particular predefined level of detail corresponding to the particular predefined position.

As a result, search results program 332 may reduce level of detail 336 to increase number of search results 330 that may be displayed within graphical user interface 318. If additional detail is desired, user 314 may manipulate moveable graphical control 334 to increase level of detail 336. The increase of level of detail 336 provides more information from search results 324 but may reduce number of search results 330 that can be displayed within graphical user interface 318.

In this manner, user 314 may adjust number of search results 330 to reach desired level of detail 338. Desired level of detail 338 may differ, depending on the preferences of user 314 and/or the type of data processing system 302. For example, when data processing system 302 is a mobile phone, graphical user interface 318 has a smaller area as compared to when data processing system 302 is a personal computer. When data processing system 302 is a mobile phone, a lower level for level of detail 336 may be desirable to view a larger number of search results 330 in the smaller area. On a desktop computer, level of detail 336 may be greater than compared to a mobile phone in these illustrative examples.

In these illustrative examples, level of detail 336 may correspond to an amount of information that is displayed. For example, user 314 may move moveable graphical control 334 to select different amounts of information that are to be displayed in graphical user interface 318. As one specific example, movement of moveable graphical control 334 may change the number of lines that is displayed for each search result displayed in graphical user interface 318.

Additionally, in these depicted examples, movement of moveable graphical control 334 by user input 316 may cause search engine 308 to change the manner in which search results 324 are identified by search engine 308. Different predefined positions for moveable graphical control 334 may correspond to different predefined methods for identifying search results 324 for display. For example, movement of moveable graphical control 334 may change a method of filtering which of search results 324 are displayed. As one specific example, a predefined position for moveable graphical control 334 may correspond to a method for search engine 308 to filter search results to identify only search results that have a URL, a title for the URL, and a list of related URLs for display. In this manner, movement of moveable graphical control 334 may change the number of search results 324 that are sent to browser 320 for display in graphical user interface 318.

In this manner, movement of moveable graphical control 334 may change level of detail 336 for search results 324 using search engine 308 and/or search results program 332.

The illustration of search system 300 in FIG. 3 is not meant to imply physical or architectural limitations to a manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

In other illustrative examples, search results program 332 may be a separate process from browser 320. In other illustrative examples, search results 324 may take the form of a plug-in for use with browser 320. In still other illustrative examples, browsers that search for other information in addition to, or instead of, web pages may use search results program 332. For example, a browser configured to search for word processing documents or spreadsheets on a network data processing system may use search results program 332.

Figure 4:
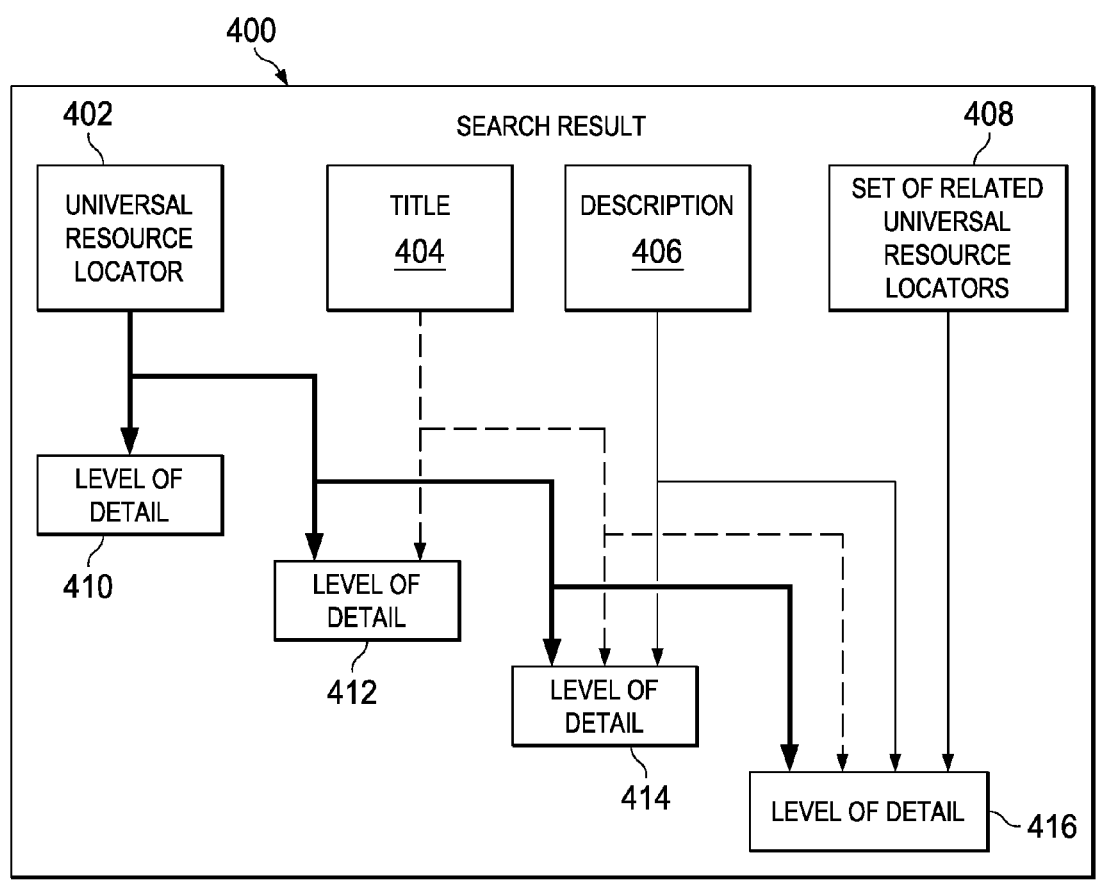
FIG. 4 is an illustration of a search result in accordance with an illustrative embodiment.

With reference now to FIG. 4, an illustration of a search result is depicted in accordance with an illustrative embodiment. In this illustrative example, search result 400 is an example of a search result in search results 324 in FIG. 3. Search result 400 includes universal resource locator 402, title 404, description 406, and set of related universal resource locators 408.

In this illustrative example, search result 400 has level of detail 410, level of detail 412, level of detail 414, and level of detail 416. Level of detail 410 includes universal resource locator 402, and level of detail 412 includes universal resource locator 402 and title 404. Level of detail 414 includes universal resource locator 402, title 404, and description 406. Level of detail 416 includes universal resource locator 402, title 404, description 406, and set of related universal resource locators 408.

Of course, in other illustrative examples, the levels of detail may be different. For example, level of detail 414 may be configured to include a portion of set of related universal resource locators 408, while level of detail 416 may be configured to include all of set of related universal resource locators 408.

Level of detail 410, level of detail 412, level of detail 414, and level of detail 416 may be selected using moveable graphical control 334 in FIG. 3. As the level of detail increases, more information from search result 400 is displayed. As the level of detail decreases, less information is displayed from search result 400.

The illustration of search result 400 in FIG. 4 is not meant to imply physical or architectural limitations to a manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

In some illustrative examples, the level of detail may not be based on the type of information. Instead, the level of detail may be based on the size. For example, the level of detail may be to display a number of bytes of information, a number of characters of information, a number of lines of information, or some other suitable manner in which a level of detail may be identified for search result 400.

Figure 5:
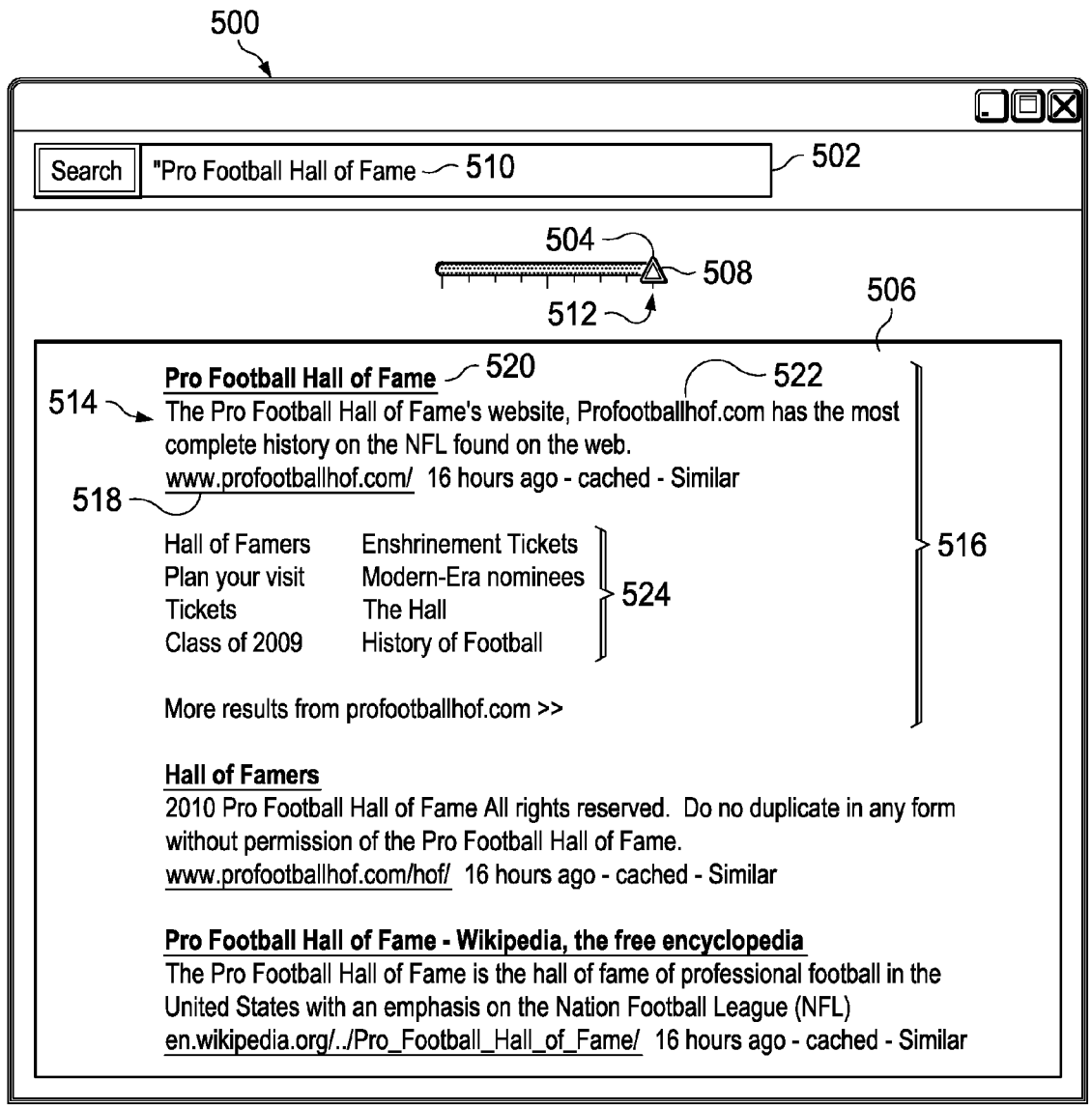
FIG. 5 is an illustration of a graphical user interface for a browser in accordance with an illustrative embodiment.

With reference now to FIG. 5, an illustration of a graphical user interface for a browser is depicted in accordance with an illustrative embodiment. In this illustrative example, graphical user interface 500 is an example of one implementation for graphical user interface 318 for browser 320 in FIG. 3.

Graphical user interface 500 includes field 502, moveable graphical control 504, and window 506. Field 502 is a field for search keywords. Moveable graphical control 504 is slider 508 in this example. Slider 508 is configured to be moved by user input to change a level of detail for search results displayed in window 506 in graphical user interface 500.

As depicted, keywords 510 have been entered in graphical user interface 500. Keywords 510 are "Pro Football Hall of Fame" in this example. Further, slider 508 has been moved to position 512. Position 512 is for a level of detail that includes a universal resource locator, a title, a description, and a set of related universal resource locators for each search result.

In response to keywords 510 and slider 508 being moved to position 512, search results 514 are displayed in window 506. As one illustrative example, search result 516 has universal resource locator 518, title 520, description 522, and set of related universal resource locators 524.

As depicted, search results 514 displayed in window 506 include three search results. Three search results may be a smaller number of search results than desired by the user. Slider 508 may be moved to a different position to reduce the level of detail presented for each result to increase the number of search results displayed.

Figure 6:
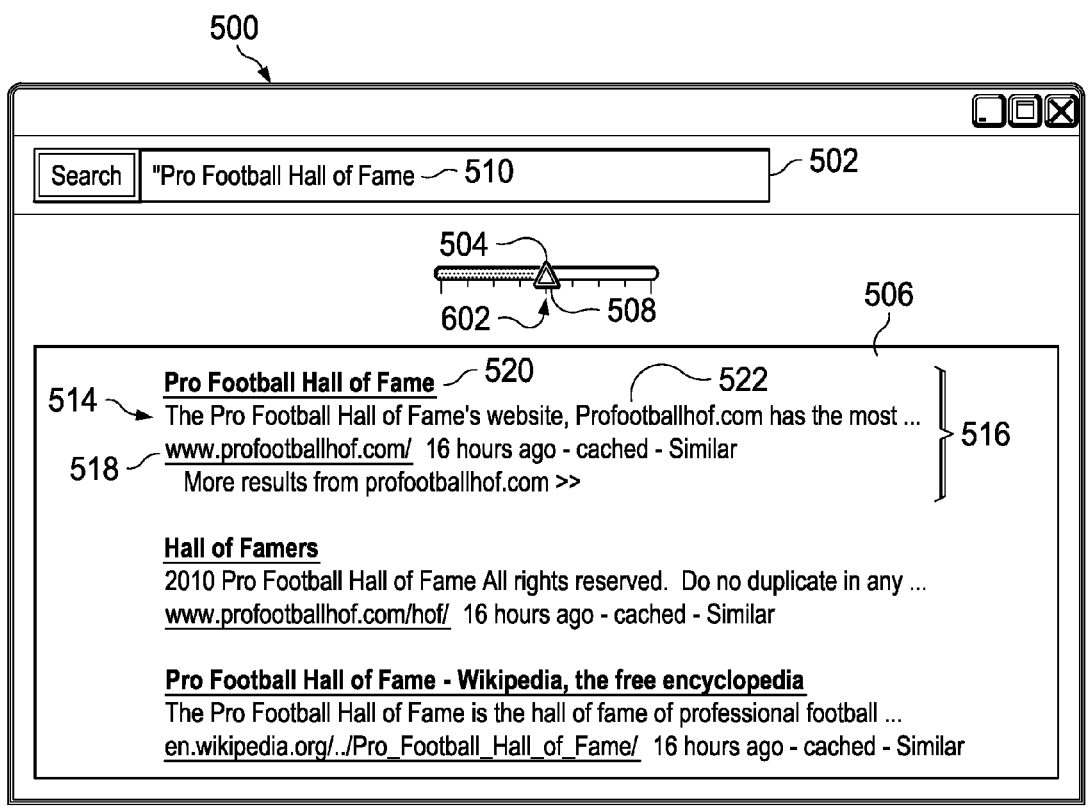
FIG. 6 is an illustration of a graphical user interface in accordance with an illustrative embodiment.

With reference now to FIG. 6, an illustration of a graphical user interface is depicted in accordance with an illustrative embodiment. In this illustrative example, graphical user interface 500 from FIG. 5 is depicted with slider 508 in position 602. In other words, the user has entered user input moving slider 508 to position 602.

In this illustrative example, position 602 for slider 508 indicates a different level of detail as compared to the level of detail indicated by position 512 for slider 508 in FIG. 5. Position 602 indicates a level of detail that includes a universal resource locator, a title, and a description. A set of related universal resource locators is not included.

For example, as illustrated, when slider 508 is in position 602, search result 516 from FIG. 5 includes universal resource locator 518, title 520, and description 522 without set of related universal resource locators 524 from FIG. 5.

Figure 7:
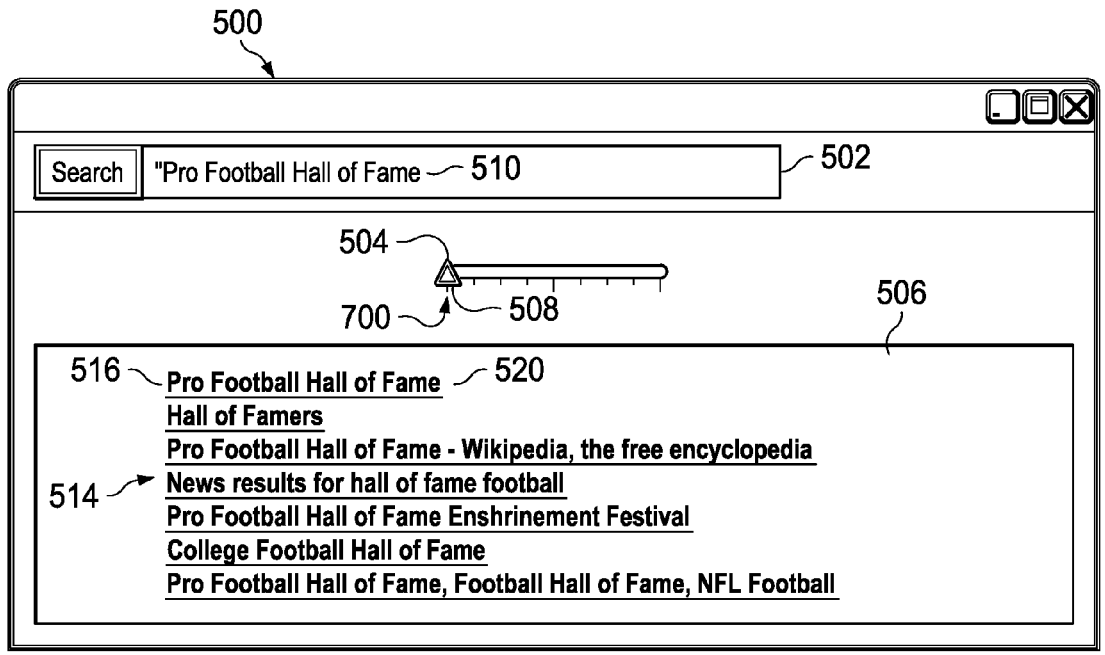
FIG. 7 is an illustration of a graphical user interface in accordance with an illustrative embodiment.

With reference now to FIG. 7, an illustration of a graphical user interface is depicted in accordance with an illustrative embodiment. In this illustrative example, graphical user interface 500 from FIG. 5 is depicted with slider 508 in position 700. In other words, the user has entered user input moving slider 508 to position 700.

In this illustrative example, position 700 for slider 508 indicates a different level of detail as compared to the level of detail indicated by position 512 for slider 508 in FIG. 5 and position 602 for slider 508 in FIG. 6. Position 700 indicates a level of detail that includes a title. A set of related universal resource locators and a description are not included.

For example, search result 516 has title 520 without universal resource locator 518, description 522, or set of related universal resource locators 524 from FIG. 5. Title 520 is a link to universal resource locator 518 in FIG. 5 and FIG. 6. As depicted, a greater number of results in search results 514 are presented in window 506 when slider 508 is in position 700 as compared to position 512 in FIG. 5 and position 602 in FIG. 6.

Figure 8:
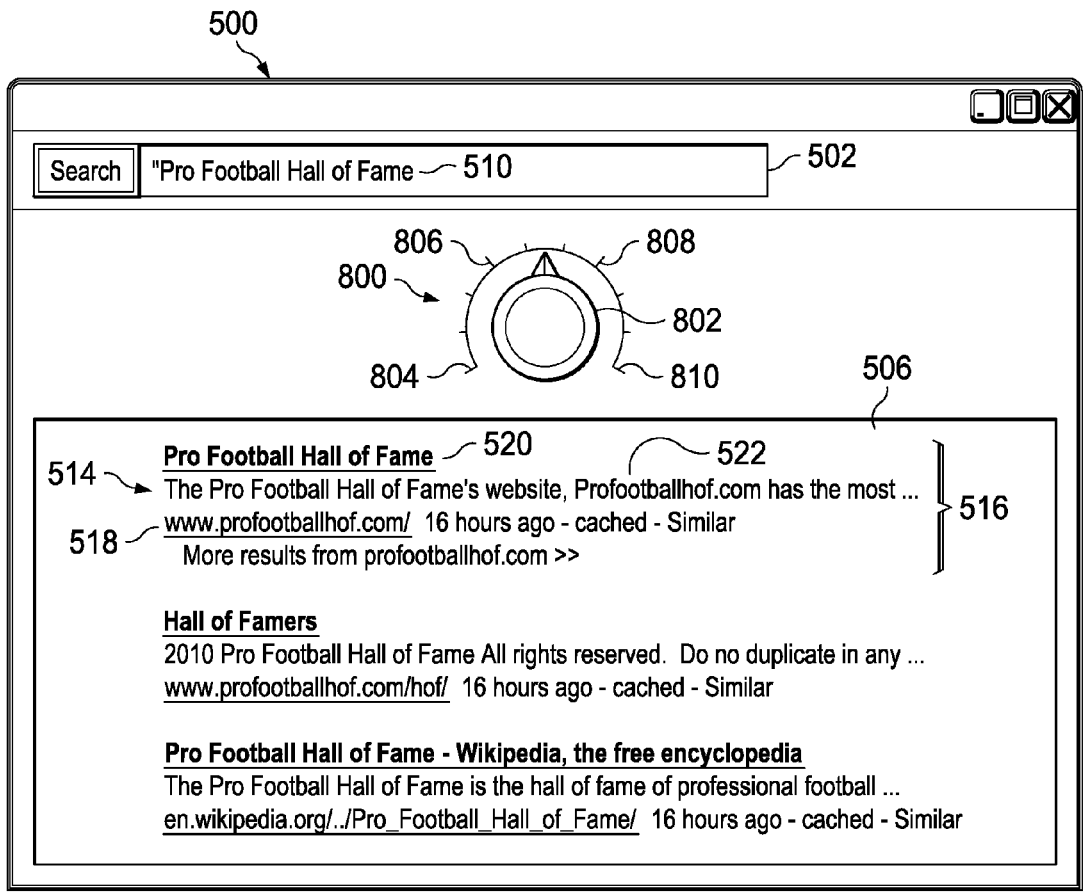
FIG. 8 is an illustration of a moveable graphical control in accordance with an illustrative embodiment.

With reference now to FIG. 8, an illustration of a moveable graphical control is depicted in accordance with an illustrative embodiment. In this illustrative example, graphical user interface 500 from FIG. 5 is depicted with moveable graphical control 800 in the place of slider 508. Moveable graphical control 800 is another example of one implementation for moveable graphical control 334 in FIG. 3. Moveable graphical control 800 is dial 802 in this example.

As depicted, a user may move dial 802 to one of position 804, position 806, position 808, and position 810. These positions for dial 802 indicate different levels of detail. As one illustrative example, position 804, position 806, position 808, and position 810 indicate level of detail 410, level of detail 412, level of detail 414, and level of detail 416 in FIG. 4, respectively.

Figure 9:
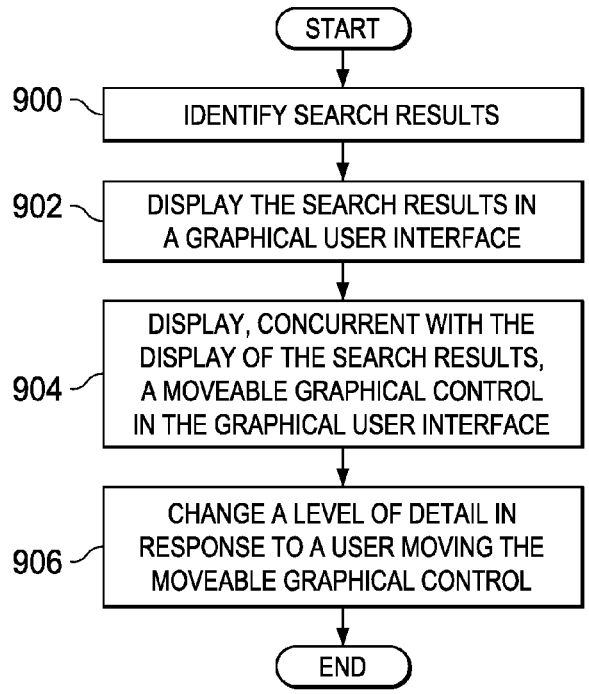
FIG. 9 is an illustration of a flowchart of a process for managing search results in accordance with an illustrative embodiment.

With reference now to FIG. 9, an illustration of a flowchart of a process for managing search results is depicted in accordance with an illustrative embodiment. The process illustrated in FIG. 9 may be implemented in search system 300 in FIG. 3. In particular, this process may be implemented using search results program 332 in FIG. 3.

The process begins by search results program 332 identifying search results 324 (step 900). Search results 324 are identified based on the search results sent by search engine 308 in FIG. 3 in response to query 322. Search results program 332 then displays search results 324 in graphical user interface 318 (step 902). In step 902, search results 324 have level of detail 336. Number of search results 330 that is displayed may be less than desired by the user.

Thereafter, search results program 332 displays, concurrent with the display of search results 324, moveable graphical control 334 in graphical user interface 318 (step 904). Moveable graphical control 334 may be a slider, such as slider 508 in FIG. 5; a dial, such as dial 802 in FIG. 8; or some other suitable type of moveable graphical control.

Search results program 332 then changes level of detail 336 in response to user 314 moving moveable graphical control 334 (step 906), with the process terminating thereafter. In step 906, user 314 may move moveable graphical control 334 to a position within a set of predefined positions. Each of these predefined positions corresponds to a particular predefined level of detail. User 314 moving moveable graphical control 334 forms user input 316. User input 316 may request a change to level of detail 336 for search results 324.

In step 906, search results program 332, using user input 316, changes level of detail 336 to the predefined level of detail corresponding to the predefined position to which moveable graphical control 334 is moved to change an amount of information that is displayed for each search result in search results 324. For example, the amount of information displayed for each search result in search results 324 is changed such that a greater number of search results 330 can be displayed in graphical user interface 318.

Number of search results 330 that can be displayed in graphical user interface 318 may depend on the size of graphical user interface 318 and/or the number of lines that graphical user interface 318 can display. Further, number of search results 330 may depend on the size of the font for the text displayed for each of search results 324. When number of search results 330 displayed does not include all of search results 324, which search results are displayed on graphical user interface 318 may be changed by scrolling through the search results.

In other illustrative examples, search results program 332 may not rely on user input 316 to change level of detail 336. For example, in some cases, search results program 332 may determine which level of detail to use for the search results based on, for example, number of search results 330 that can be displayed on graphical user interface 318 at one time. Search results program 332 may make this determination using a number of rules, such as, for example, without limitation, a desired number of search results being displayed at any given time, a desired font size for the search results displayed, and/or other types of rules. In this manner, level of detail 336 for search results 324 may be changed to desired level of detail 338 in FIG. 3.

In some illustrative examples, the display of moveable graphical control 334 in step 904 may be performed prior to the display of search results in step 902. In these illustrative examples, user 314 may move moveable graphical control 334 before and/or after the display of search results 324 in step 902.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-readable medium providing program code for use by or in connection with a computer or any instruction system.

The computer-readable storage device can be an electronic, magnetic, optical, electromagnetic, or semiconductor system (or apparatus or device). The terms "computer-readable storage device" and "computer-readable storage devices" do not include signal propagation media such as a copper cable, optical fiber or wireless transmission media. Examples of a computer-readable storage device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

What is claimed is:

1. A method for managing search results, the method comprising:

displaying the search results in a graphical user interface, the search results including respective universal resource locators ("URLs") of documents matching search criteria for the search results, respective names of the documents matching the search criteria, respective text excerpts from the documents matching the search criteria, and additional URLs of additional documents for at least some of the respective, matching documents, the additional documents related to in subject but not matching all of the search criteria;

subsequently, in response to user input to provide less information in the display of the search results, deleting the text excerpts and the additional URLs from the display of the search results and continuing to display the respective universal resource locators ("URLs") of the documents matching the search criteria, and the respective names of the documents matching the search criteria, wherein the user input results from a user moving a moveable graphical control in the graphical user interface, the moveable graphical control is displayed, by one or more processors, concurrent with the display of the search results in the graphical user interface, and the moveable graphical control is one of a slider, a spinner, and a dial, wherein the user moves the moveable graphical control to change a level of detail for displaying the search results during one or more of before the search results are displayed and after the search results are displayed, wherein the step of displaying, by one or more processors, the search results in the graphical user interface is responsive to a prior step of:

filtering, by one or more processors, the search results to remove any of the search results that do not have the level of detail.

2. A method for managing search results, the method comprising:

displaying the search results in a graphical user interface, the search results including respective universal resource locators ("URLs") of documents matching search criteria for the search results, respective names of the documents matching the search criteria, respective text excerpts from the documents matching the search criteria, and additional URLs of additional documents for at least some of the respective, matching documents, the additional documents related to in subject but not matching all of the search criteria;

subsequently, in response to user input to provide less information in the display of the search results, deleting the text excerpts and the additional URLs from the display of the search results and continuing to display the respective universal resource locators ("URLs") of the documents matching the search criteria, and the respective names of the documents matching the search criteria, wherein the user input results from a user moving a moveable graphical control in the graphical user interface, the moveable graphical control is displayed, by one or more processors, concurrent with the display of the search results in the graphical user interface, and the moveable graphical control is one of a slider, a spinner, and a dial, wherein the user moves the moveable graphical control to change a level of detail for displaying the search results during one or more of before the search results are displayed and after the search results are displayed, wherein the step of displaying, by one or more processors, the search results in the graphical user interface is responsive to a prior step of:

receiving, by one or more processors, the search results from a search engine, wherein the search results received from the search engine have been filtered, by the search engine, to remove any of the search results that do not have the level of detail.

3. A method for managing search results, the method comprising:

displaying the search results in a graphical user interface, the search results including respective universal resource locators ("URLs") of documents matching search criteria for the search results, respective names of the documents matching the search criteria, respective text excerpts from the documents matching the search criteria, and additional URLs of additional documents for at least some of the respective, matching documents, the additional documents related to in subject but not matching all of the search criteria;

subsequently, in response to user input to provide less information in the display of the search results, deleting the text excerpts and the additional URLs from the display of the search results and continuing to display the respective universal resource locators ("URLs") of the documents matching the search criteria, and the respective names of the documents matching the search criteria, wherein the displayed search results, before the user input to provide less information in the display, also includes respective text excerpts from the additional documents, and further comprising:

in response to the user input to provide less information in the display of the search results, deleting the respective text excerpts from the additional documents from the display of the search results.

* * * * *